US012338033B2

(12) United States Patent
Given et al.

(10) Patent No.: US 12,338,033 B2
(45) Date of Patent: Jun. 24, 2025

(54) VESSEL WITH COMPOSITE HANDLE

(71) Applicant: BERCOM INTERNATIONAL, LLC, Chanhassen, MN (US)

(72) Inventors: Jeffrey Given, St. Paul, MN (US); Mark Bergman, Minnetonka, MN (US); Jeffrey Waffensmith, North Oaks, MN (US); Matthew Leyden, St. Paul, MN (US)

(73) Assignee: BERCOM INTERNATIONAL, LLC, Chanhassen, MN (US)

(*) Notice: Subject to any disclaimer, the term of this patent is extended or adjusted under 35 U.S.C. 154(b) by 145 days.

(21) Appl. No.: 18/168,629

(22) Filed: Feb. 14, 2023

(65) Prior Publication Data

US 2023/0264860 A1 Aug. 24, 2023

Related U.S. Application Data

(60) Provisional application No. 63/313,456, filed on Feb. 24, 2022.

(51) Int. Cl.

*B65D 25/32* (2006.01)
*B65D 25/28* (2006.01)
*E06C 7/14* (2006.01)

(52) U.S. Cl.

CPC ......... *B65D 25/32* (2013.01); *B65D 25/2888* (2013.01); *B65D 2525/289* (2013.01); *E06C 7/14* (2013.01)

(58) Field of Classification Search

CPC .............. B65D 25/2801; B65D 25/252; B65D 25/2888; B65D 25/2882; E06C 7/14;
(Continued)

(56) References Cited

U.S. PATENT DOCUMENTS 768,364 A 8/1904 Hines
787,911 A 4/1905 Gerhardt
(Continued)

FOREIGN PATENT DOCUMENTS

CA 2846733 11/2017
DE G 87 12 533.1 3/1988
(Continued)

OTHER PUBLICATIONS

SPORTY's website showing a "Painter's Helper" ID#: 1610T paint container manufactured by Aqua-Trainer Co., of Shorewood, Illinois (published as of Aug. 31, 2001); at http://www.sportys.com/acb/showdetl.cfm?&User ID=31121&St=2796&St2=-82839673&St3=71483872, accessed Sep. 21, 2001.
(Continued)

*Primary Examiner* — Mollie Impink
(74) *Attorney, Agent, or Firm* — Mai D. Lauer; Westman, Champlin & Koehler P.A.

(57) ABSTRACT

A vessel includes a container, a bracket, a bail and a grip. The container has a cavity configured to hold a liquid. The bracket extends from the container and comprises an arm spaced from the container. The arm has opposed first and second ends, and the arm is connected to the container only at its first end. The bail is pivotally connected to the container and has a grip thereon. The vessel is configured so that the grip has a position that is in contact with the arm, thereby defining, in combination, a composite vessel handle. A method of supporting a vessel includes pivoting the bail so that the grip is in contact with the arm and positioning at least a portion of a hand on the grip.

14 Claims, 10 Drawing Sheets

(58) Field of Classification Search
CPC .......... A47J 47/18; A47J 45/02; A47J 45/062; B44D 3/12; B44D 3/121; A45F 5/10
USPC ................ 220/756, 771, 482, 476, 480, 755
See application file for complete search history.

(56) References Cited

U.S. PATENT DOCUMENTS 1,268,775 A 6/1918 Stanger
1,304,415 A 5/1919 Tucker
1,590,572 A 6/1926 Fredette
1,593,043 A 7/1926 Stroecker
1,599,222 A 9/1926 Engelman
1,678,005 A 7/1928 Hallerman
1,734,976 A 11/1929 McClellan
1,880,319 A 10/1932 Iasillo
1,950,505 A 3/1934 Matters
2,048,430 A 7/1936 Corrello
2,228,536 A 1/1941 Scalph
2,394,823 A 2/1946 Thorson
2,431,808 A * 12/1947 Kluit ...................... A47J 45/08 D7/395
2,444,986 A 7/1948 Gebhardt
2,541,390 A 2/1951 Weigand
2,564,043 A * 8/1951 Ward ...................... A47J 45/10 248/113
2,601,413 A 6/1952 Miles
2,617,676 A 11/1952 Kinney
2,626,737 A 1/1953 Pitz
2,686,033 A 8/1954 Keiter
2,709,540 A 5/1955 Kenney
2,765,969 A 10/1956 Bennington
2,932,544 A 4/1960 Lambert
2,991,037 A 7/1961 Becher
3,013,759 A 12/1961 Close
3,014,621 A 12/1961 Povitz
3,107,028 A 10/1963 Robertis
3,115,916 A 12/1963 Stephens
3,116,947 A 1/1964 Brownrigg
3,138,280 A 6/1964 Shafer
3,139,646 A 7/1964 Vernon
3,175,743 A 3/1965 Richard
D202,134 S 8/1965 Bryan
3,219,233 A 11/1965 Whiteford
3,229,820 A 1/1966 Hentzi et al.
3,272,467 A 9/1966 Kassube
3,292,815 A 12/1966 Smith
3,309,000 A 3/1967 Haverstick
3,317,232 A 5/1967 McFaul
D212,277 S 11/1968 Koch
3,425,012 A 1/1969 Gottinger
3,474,996 A 10/1969 Stamm
3,536,285 A 10/1970 Vaughn
3,590,416 A 7/1971 Henningsen
3,593,951 A 7/1971 Warner
3,595,431 A 7/1971 Bird
3,602,939 A 9/1971 Schoenholz
3,603,548 A * 9/1971 Meyer, III ................ E06C 7/14 248/312.1
119,666 A * 10/1971 Stuart ................... A47J 45/062 220/765
3,661,351 A 5/1972 Olsen
3,682,352 A 8/1972 Doucette
3,707,242 A 12/1972 Golden
3,729,158 A 4/1973 Nagy
3,828,389 A 8/1974 Heisler
3,837,034 A 9/1974 Leffert
3,920,147 A 11/1975 Hiatt
3,940,824 A 3/1976 Gioia et al.
4,061,242 A 12/1977 Donlon
D248,335 S 6/1978 Cooke
4,101,046 A 7/1978 Puntillo
4,133,604 A 1/1979 Fuller
4,164,299 A 8/1979 Fuhr
4,297,762 A 11/1981 Crysdale
4,396,174 A 8/1983 Continenza
D270,961 S 10/1983 Hawkins
D272,415 S 1/1984 Case
4,446,969 A 5/1984 Tyler
4,491,293 A 1/1985 Tibbs
4,519,565 A 5/1985 Whitmore
4,527,763 A 7/1985 Woytowich
4,556,245 A 12/1985 Gruenwald
4,627,546 A 12/1986 Carranza
4,702,395 A 10/1987 Nitsch
4,791,030 A 12/1988 DeMars
4,823,433 A 4/1989 Curtis
4,860,891 A 8/1989 Biggio
4,865,282 A 9/1989 Yonkman et al.
4,895,269 A 1/1990 Cade
4,927,046 A 5/1990 Armstrong
4,928,873 A 5/1990 Johnson
4,966,300 A 10/1990 Coonradt
4,984,763 A 1/1991 O'Donnell
5,011,536 A 4/1991 Boom
5,033,704 A 7/1991 Kerr
D320,295 S 9/1991 Delmerico
5,083,733 A 1/1992 Marino et al.
5,085,386 A 2/1992 Hicks et al.
5,092,481 A 3/1992 Skelton
D327,555 S 6/1992 Juergens
5,147,067 A 9/1992 Effertz
5,169,025 A 12/1992 Guo
5,222,656 A 6/1993 Carlson
5,269,095 A 12/1993 Helfman et al.
5,277,733 A 1/1994 Effertz
D345,832 S 4/1994 Fraze
5,305,977 A 4/1994 Roth
5,308,181 A 5/1994 Hull et al.
5,320,249 A 6/1994 Strech
5,320,279 A 6/1994 Giblin et al.
5,322,183 A 6/1994 Strachan
5,333,353 A 8/1994 Taylor
D353,241 S 12/1994 Breen
5,379,536 A 1/1995 Lorenzana
5,400,916 A 3/1995 Weber
5,413,231 A 5/1995 Carroll et al.
5,429,262 A 7/1995 Sharkey
5,482,339 A * 1/1996 Chishko, Jr. ............. B44D 3/14 220/759
5,493,751 A 2/1996 Misiukowiec
5,511,279 A 4/1996 Ippolito
5,548,865 A 8/1996 Pagani
5,549,216 A 8/1996 Scholl
D374,321 S 10/1996 Mandell
5,570,807 A 11/1996 Busch
5,624,093 A 4/1997 Gemmell
5,641,087 A 6/1997 Moffitt
5,687,941 A 11/1997 Quintile
D389,626 S 1/1998 Lundy
5,746,346 A 5/1998 Crilly
D395,531 S 6/1998 Mandell
D396,914 S 8/1998 Pepper
5,810,196 A 9/1998 Lundy
RE35,933 E 10/1998 Scholl
5,826,844 A 10/1998 Purdy
D401,116 S 11/1998 Demore
5,836,469 A 11/1998 Zebrowski
5,855,346 A 1/1999 Hall
5,865,409 A 2/1999 Nimer
5,971,201 A 10/1999 Daw
D417,051 S 11/1999 Dickinson
6,062,389 A 5/2000 Kent
6,065,633 A 5/2000 Abbey
D426,361 S 6/2000 Young
D429,862 S 8/2000 Houry
6,102,235 A 8/2000 Stern et al.
6,105,816 A 8/2000 Shea
6,119,303 A 9/2000 Passafiume
6,135,310 A 10/2000 Svehaug
6,135,312 A 10/2000 Chen
6,138,963 A 10/2000 Malvasio
6,148,958 A 11/2000 Ahl et al.
D435,728 S 1/2001 Miles et al.
D444,278 S 6/2001 Myers

(56) References Cited

U.S. PATENT DOCUMENTS

| | | | | |
|---|---|---|---|---|
| D444,929 | S | 7/2001 | Cox | |
| 6,260,730 | B1 | 7/2001 | Fellman | |
| 6,382,354 | B2 | 5/2002 | Ahl et al. | |
| D458,723 | S | 6/2002 | Malvasio | |
| D460,845 | S | 7/2002 | Bergman | |
| 6,417,293 | B1 | 7/2002 | Chorvath et al. | |
| 6,419,106 | B1 | 7/2002 | Bebak | |
| 6,446,829 | B1 | 9/2002 | Malvasio et al. | |
| D466,407 | S | 12/2002 | Nance | |
| 6,513,626 | B2 | 2/2003 | MacSweeney et al. | |
| D477,447 | S | 7/2003 | Calaicone | |
| D477,702 | S | 7/2003 | Kohn | |
| 6,604,721 | B2 | 8/2003 | Ahl et al. | |
| D482,830 | S | 11/2003 | Kohn | |
| D483,917 | S | 12/2003 | Frantz | |
| 6,708,838 | B2 | 3/2004 | Bergman et al. | |
| D493,035 | S | 7/2004 | Bergman | |
| 6,929,225 | B1 | 8/2005 | Kent | |
| 6,991,829 | B2 | 1/2006 | Bergman | |
| D527,153 | S * | 8/2006 | Morad | D32/53 |
| 7,191,913 | B2 | 3/2007 | Byrne | |
| D581,119 | S | 11/2008 | Bergman | |
| 7,578,411 | B1 | 8/2009 | Zien et al. | |
| D606,720 | S | 12/2009 | Bergman | |
| 7,644,835 | B2 | 1/2010 | Bergman | |
| 7,789,358 | B1 | 9/2010 | Adams | |
| 8,286,825 | B2 | 10/2012 | Billado, Jr. | |
| 8,413,839 | B2 | 4/2013 | Horvath | |
| 8,505,788 | B2 | 8/2013 | Thibault | |
| 8,556,116 | B2 | 10/2013 | Bergman et al. | |
| 8,870,252 | B2 | 10/2014 | Pratho | |
| 8,887,940 | B2 * | 11/2014 | Kiceniuk, Jr. | B44D 3/127 248/339 |
| 8,919,604 | B2 | 12/2014 | Bergman et al. | |
| 9,409,200 | B2 | 8/2016 | Bergman et al. | |
| 10,266,000 | B2 | 4/2019 | Fee et al. | |
| 10,266,306 | B2 | 4/2019 | Bergman | |
| 2002/0036206 | A1 | 3/2002 | Bergman et al. | |
| 2002/0056714 | A1 | 5/2002 | Schinkel | |
| 2002/0117592 | A1 | 8/2002 | Traylor | |
| 2002/0185509 | A1 | 12/2002 | Wichman et al. | |
| 2004/0118861 | A1 | 6/2004 | Bergman et al. | |
| 2004/0195248 | A1 | 10/2004 | Garcia | |
| 2004/0206761 | A1 | 10/2004 | Frantz | |
| 2004/0217242 | A1 | 11/2004 | Foreman | |
| 2004/0256335 | A1 | 12/2004 | Sholem | |
| 2005/0156085 | A1 | 7/2005 | Radovan | |
| 2005/0184077 | A1 | 8/2005 | Martinson | |
| 2006/0102638 | A1 * | 5/2006 | Summerfield | A45F 5/102 220/755 |
| 2006/0243732 | A1 * | 11/2006 | Bergman | B44D 3/126 220/757 |
| 2009/0250294 | A1 | 10/2009 | Byers | |
| 2010/0176140 | A1 | 7/2010 | Bergman | |
| 2012/0193251 | A1 * | 8/2012 | Rittmann | B44D 3/128 206/229 |
| 2014/0014670 | A1 | 1/2014 | Bergman et al. | |
| 2014/0076893 | A1 * | 3/2014 | Cheek | B65D 1/40 220/669 |
| 2014/0124520 | A1 | 5/2014 | Allan | |
| 2015/0090747 | A1 | 4/2015 | Bergman et al. | |
| 2016/0311579 | A1 | 10/2016 | Bergman et al. | |
| 2017/0113838 | A1 | 4/2017 | Bergman | |
| 2019/0217991 | A1 | 7/2019 | Bergman et al. | |
| 2019/0344611 | A1 | 11/2019 | Valero | |
| 2020/0276859 | A1 | 9/2020 | Lambertson, Jr. et al. | |

FOREIGN PATENT DOCUMENTS

| | | |
|---|---|---|
| FR | 1029741 | 6/1953 |
| FR | 2633201 | 12/1989 |
| GB | 195523 | 4/1923 |
| GB | 2 291 923 | 2/1996 |
| JP | 10287339 | 10/1998 |

OTHER PUBLICATIONS

Purdy website showing “Purdy NEST™ Dual Roll-Off Bucket Liner” Item # 140700000 (dated 2013); at www.purdy.com/products/trays-storage/trays/nest-dual-rolloff-bucket-liner, accessed Jul. 8, 2021.

Purdy website showing “Purdy NEST™ Dual Roll-Off Bucket” Item # 140796018 (dated 2013); at www.purdy.com/products/trays-storage/trays/nest-dual-rolloff-bucket, accessed Jul. 8, 2021.

Fourteen (14) photos of a pail known to the public prior to Apr. 29, 2004 (14 pages).

* cited by examiner

VESSEL WITH COMPOSITE HANDLE

CROSS-REFERENCE TO RELATED APPLICATION

This application claims the benefit of priority of U.S. Provisional Patent Application No. 63/313,456, filed Feb. 24, 2022; the priority application is hereby incorporated by reference in its entirety.

BACKGROUND

Vessels, containers, or trays are utilized for carrying a variety of materials or fluids. Typically, a handle is provided, which allows a user to carry or hold the container without contacting the fluid therein. A relative large container with a sturdy handle configuration is useful in many commercial or household uses and is especially useful in painting applications.

SUMMARY

In one aspect, a vessel comprises a container, a bracket, a bail and a grip. The container has a cavity configured to hold a liquid. The bracket extends from the container and comprises an arm spaced from the container. The arm has opposed first and second ends, and the arm is connected to the container only at its first end. The bail is pivotally connected to the container. The grip is disposed on at least a portion of the bail. The vessel is configured so that the grip has a position that is in contact with the arm, thereby defining, in combination, a composite vessel handle.

In another aspect, a method of supporting a vessel is described. The vessel comprises a container, a bracket, a bail and a grip. The container has a cavity configured to hold a liquid. The bracket extends from the container and comprises an arm spaced from the container. The arm has opposed first and second ends, and the arm is connected to the container only at its first end. The bail is pivotally connected to the container. The grip is disposed on at least a portion of the bail. The method comprises pivoting the bail so that the grip is in contact with the arm and positioning at least a portion of a hand on the grip and the arm.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter.

Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

Figure 1:
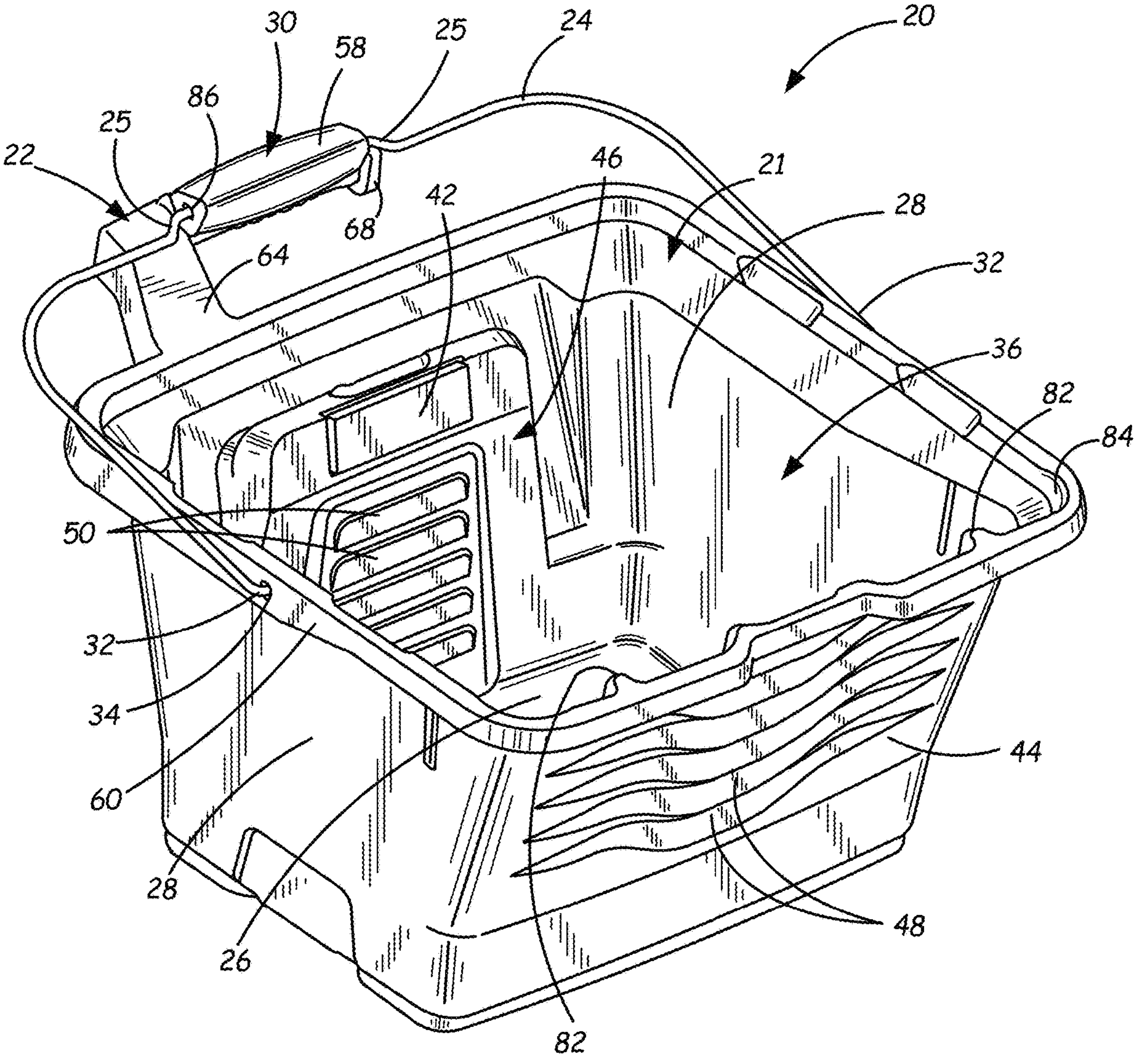
FIG. 1 is a perspective view of an exemplary embodiment of a vessel, from the top, front and left side thereof.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

The terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps and do not supply a serial or numerical limitation on the elements or steps of the embodiments thereof. For example, “first,” “second,” and “third” elements or steps need not necessarily appear in that order, and the embodiments thereof need not necessarily be limited to three elements or steps. Unless indicated otherwise, any labels such as “left,” “right,” “front,” “back,” “top,” “bottom,” “forward,” “reverse,” “clockwise,” “counter clockwise,” “up,” “down,” or other similar terms such as “upper,” “lower,” “aft,” “fore,” “vertical,” “horizontal,” “proximal,” “distal,” “intermediate” and the like are used for convenience and are not intended to imply, for example, any particular fixed location, orientation, or direction. Instead, such labels are used to reflect, for example, relative location, orientation, or directions. The singular forms of "a," "an," and "the" include plural references unless the context clearly dictates otherwise.

DETAILED DESCRIPTION

This disclosure relates to a holding vessel and more particularly to a container configured for use with a paint roller having a length of about nine inches. The vessel includes a ladder bracket and a bail, wherein a bail grip can be positioned relative to the ladder bracket to form a composite handle.

FIGS. 1-11 show various views of an exemplary embodiment of a vessel 20 having a container 21, bracket 22 and bail 24. In some cases, this disclosure refers to a ladder bracket or bail handle. However, these descriptions of suitable uses are not intended to limit the structures to the uses described. It is contemplated that the vessel can be supported by structures other than a ladder or a user's hand, such as a scaffold bar, ground surface, joist, or other support, for example.

In an exemplary embodiment, container 21 includes a bottom wall 26 connected to front wall 44, rear wall 46 and side walls 28. In an exemplary embodiment, bail 24 is manufactured separately from container 21 and is attachable thereto. In an exemplary embodiment, ladder bracket 22 is formed integrally with container 21. In an exemplary embodiment, vessel 20 is made of polypropylene (or other suitable material, preferably plastic) to withstand the harmful effects of paint, stain or varnish. Recycled plastics, such as from car battery cases, may be used. The material in an exemplary embodiment is non-corrosive to prevent the formation of rust from repeated use and cleaning. Injection molding is a suitable manufacturing process for the formation of vessel 20. Although the discussion herein will focus on paint, it is understood that the described vessel 20 can also be used to hold other fluid materials, such as another surface coating such as a protectant or varnish; an adhesive; a roofing, pavement or driveway coating; or a textured surface material, for example.

In an exemplary embodiment, bail 24 is formed of a metallic wire and has a central grip 30 made of an elastomer, rubber, or other flexible, yet durable material. In an exemplary embodiment, bail 24 attaches to a rim 60 of container 21 by insertion of ends 32 into apertures 34. In an exemplary embodiment, bail 24 has bends 25 on either side of grip 30 to retain grip 30 in a central location on bail 24, to overlay bracket 22 when pivoted toward a back of container 21. In an exemplary embodiment, rim 60 extends laterally and downwardly from walls 28, 44, 46 to form a lightweight, structurally strengthening top perimeter feature.

In an exemplary embodiment, container 21 has a continuous inner surface 36 that includes inner surfaces of bottom wall 26, front wall 44, rear wall 46 and side walls 28; the inner surface 36 defines a cavity of vessel 20 for carrying, holding or transporting loose materials or fluids, such as paint, stain or varnish. In an exemplary embodiment, vessel 20 includes a retainer for keeping a paintbrush or other tool within container 21, preferably raised from the floor 26 of the cavity. In an embodiment, the retainer is at least one magnet 42, which can be exposed in the cavity of container 21. In another embodiment, magnet 42 is not necessarily exposed, but its magnetic force is active in the cavity of container 21, such as through a thin layer of material. A user can position a metallic ferrule portion of a tool such as paintbrush (not shown) against or proximate magnet 42, such as with the bristles of the paintbrush disposed inside the cavity of container 21, such that paint on the bristles drips into the cavity.

Figure 14:
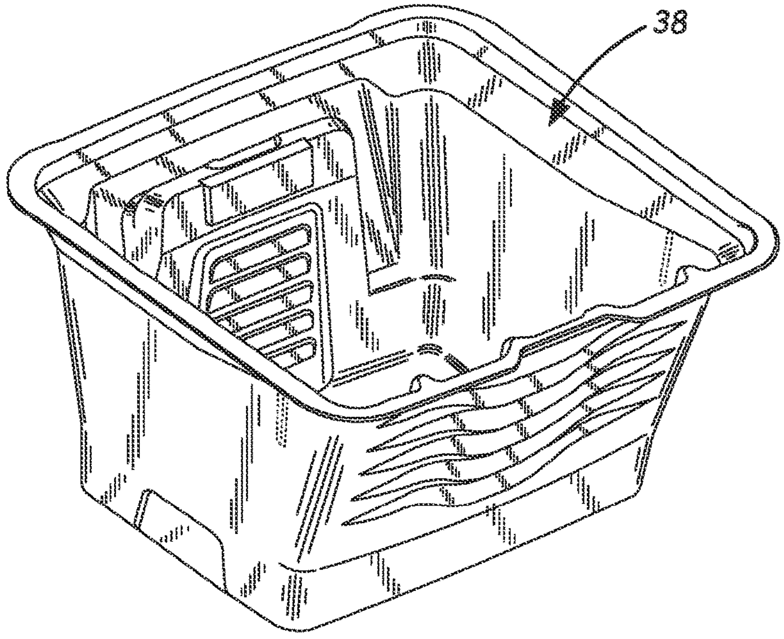
FIG. 14 is a perspective view of a liner configured to fit into a cavity of the vessel.

A user can insert a disposable liner 38 in the cavity of vessel 20. As shown in FIG. 14, an exemplary liner 38 is thin but relatively rigid, so that it does not deform in use, as a plastic film bag might. An exemplary liner 38 has contours that closely match those of inner surface 36 of vessel 20, so that use of liner 38 does not adversely affect the effective capacity of vessel 20. Moreover, a material of liner 38 suitably does not adversely affect the ability of magnet 42 to attract and retain a metallic tool portion, even when the liner 38 is interposed between the magnet 42 and the tool. In an exemplary embodiment, liner 38 is formed of a lightweight plastic material and can be used as a disposable or semi disposable component. Liner 38 has contours that fit closely to the inner surface 36 of vessel 20, so that its use does not interfere with paint distribution features of the vessel 20.

In an exemplary embodiment, each of front wall 44, rear wall 46 and side walls 28 inclines outwardly from bottom wall 26, so that an upper portion of the cavity of vessel 20 has a larger lateral cross-section dimension than a lower portion. The larger cross-sectional dimension of the upper portion allows for easy access into the cavity of vessel 20 for insertion of a tool such as a paint brush or paint roller 40 (shown in FIG. 10). The relatively smaller cross-sectional dimension of lower portion increases a depth of liquid at the bottom of container 21 for easy access by the tool. Moreover, the overall angled orientations of the walls 28, 44, 46 allow for nesting of multiple vessels 20, thereby providing for space savings in storage, transport and merchandise display.

Figure 10:
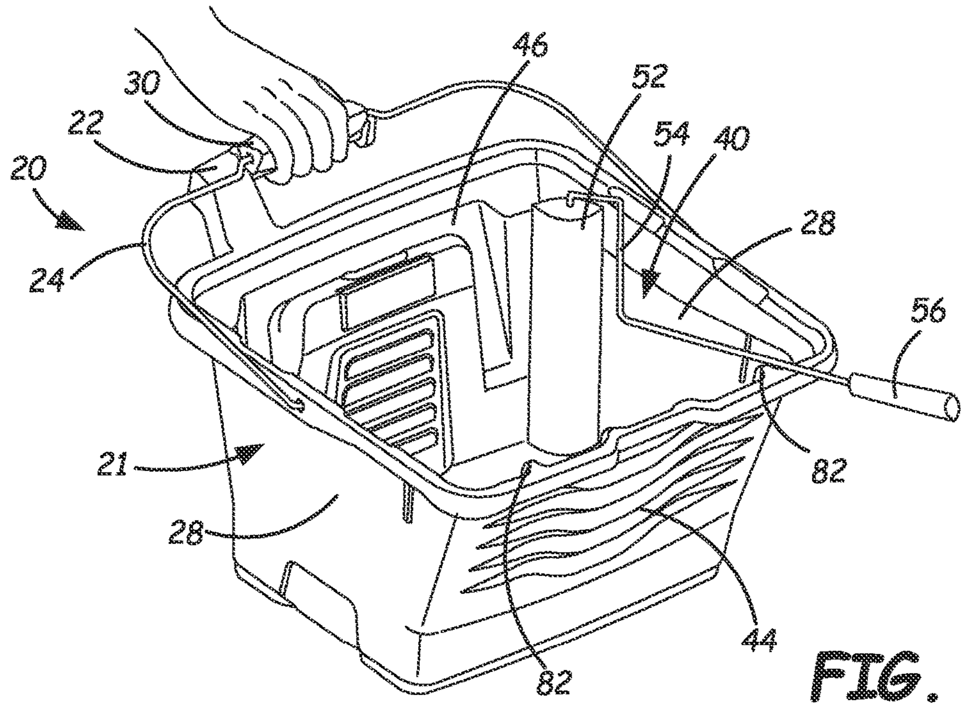
FIG. 10 is similar to FIG. 1 but shows a person holding the vessel by a composite handle and a paint roller held in a cavity of the vessel.

In an exemplary embodiment, each of front wall 44 and rear wall 46 provides a textured rolling surface for a paint brush or paint roller 40 (shown in FIG. 10). In an exemplary embodiment, front wall 44 comprises a plurality of ridges 48, each ridge 48 configured as a relatively pronounced curvilinear element. In an exemplary embodiment, rear wall 46 comprises a plurality of ridges 50, each ridge 50 configured as a relatively shallow rectilinear element. Thus, the front and rear walls 44, 46 offer differently textured surfaces against which a user may roll or brush a tool to evenly distribute paint thereon and remove excess paint therefrom.

Paint roller 40 can include roller 52, frame 54 and handle 56. Typically, a user dips paint roller 40 into a pool of paint or other fluid contained within vessel 20 to coat roller 52 with the paint or fluid. The user can then press roller 52 against front or rear wall 44, 46 while moving handle 56 up and down to remove excess paint from roller 52 and more evenly distribute the paint upon the surface of roller 52. Another tool, such as a paint brush (not shown) can similarly be moved with its bristles against ridges 48, 50 to remove excess paint from the brush and more evenly distribute the paint upon the surface of its bristles. The excess paint is captured by ridges 48, 50 and flows by gravity back into the pool of fluid within container 21. Thus, a user can apply a uniform load of paint on a paint tool.

Figure 2:
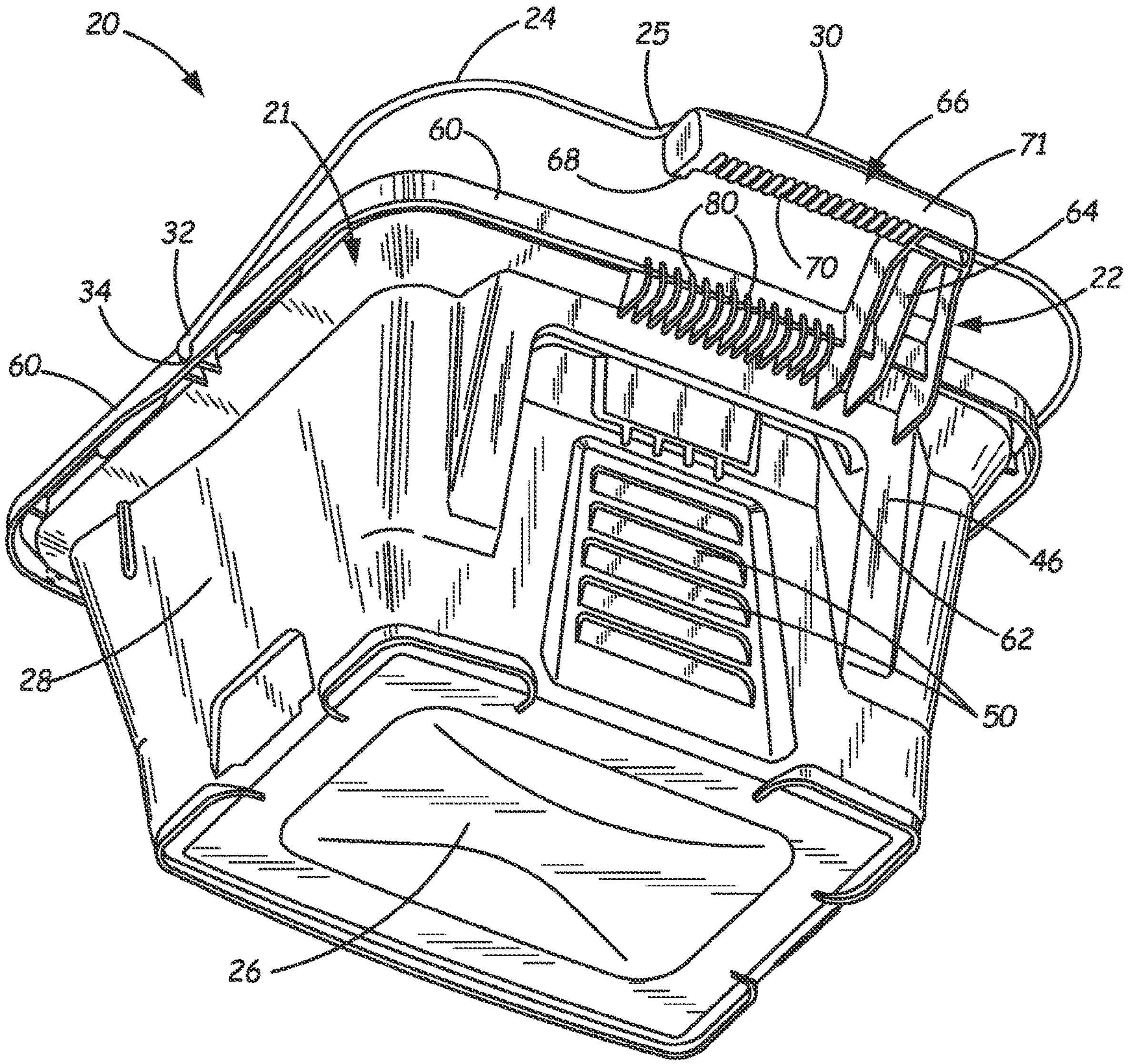
FIG. 2 is a perspective view thereof, from the bottom, rear and right side.
Figure 3:
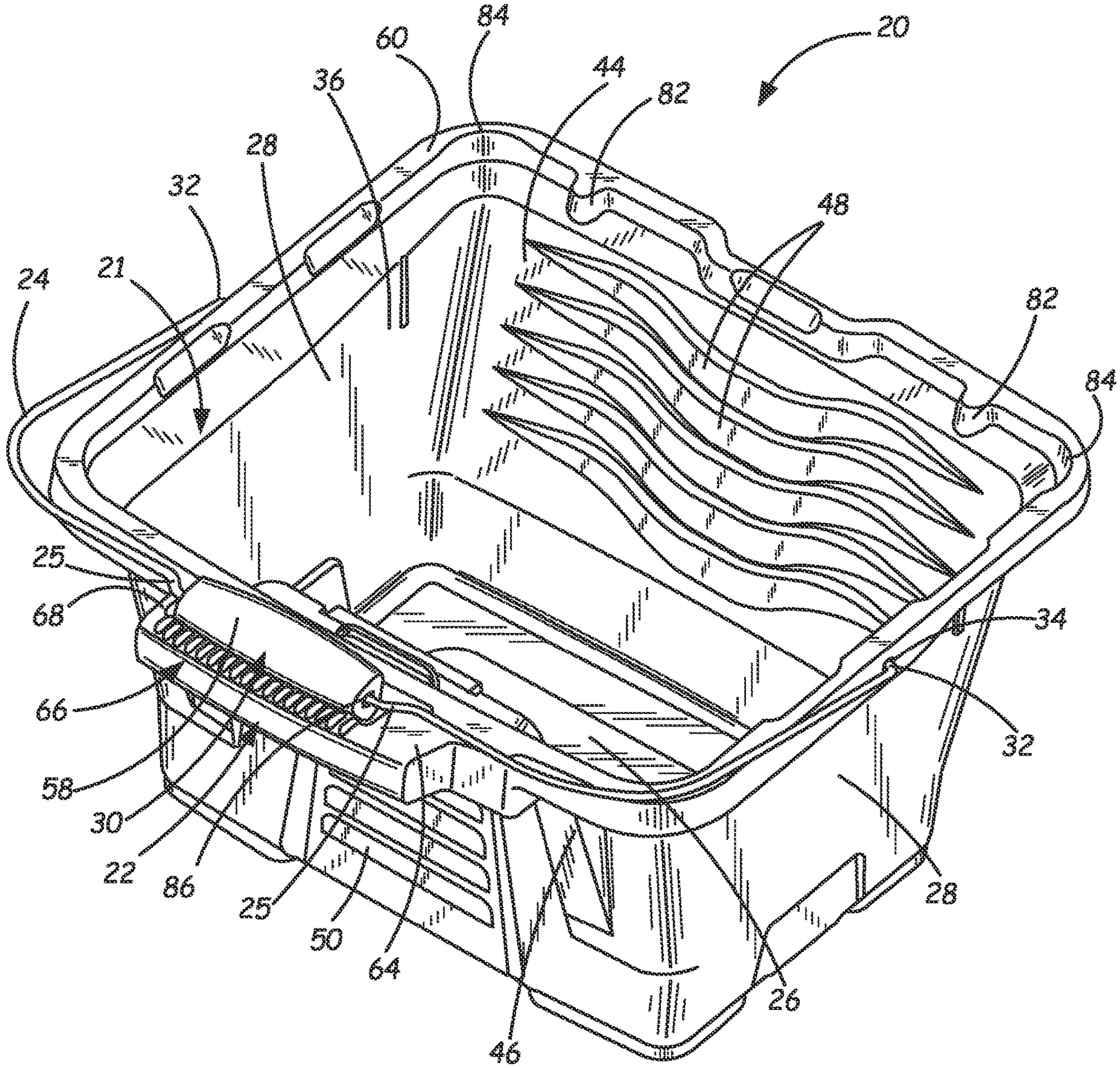
FIG. 3 is a perspective view thereof, from the top, rear and left side.
Figure 4:
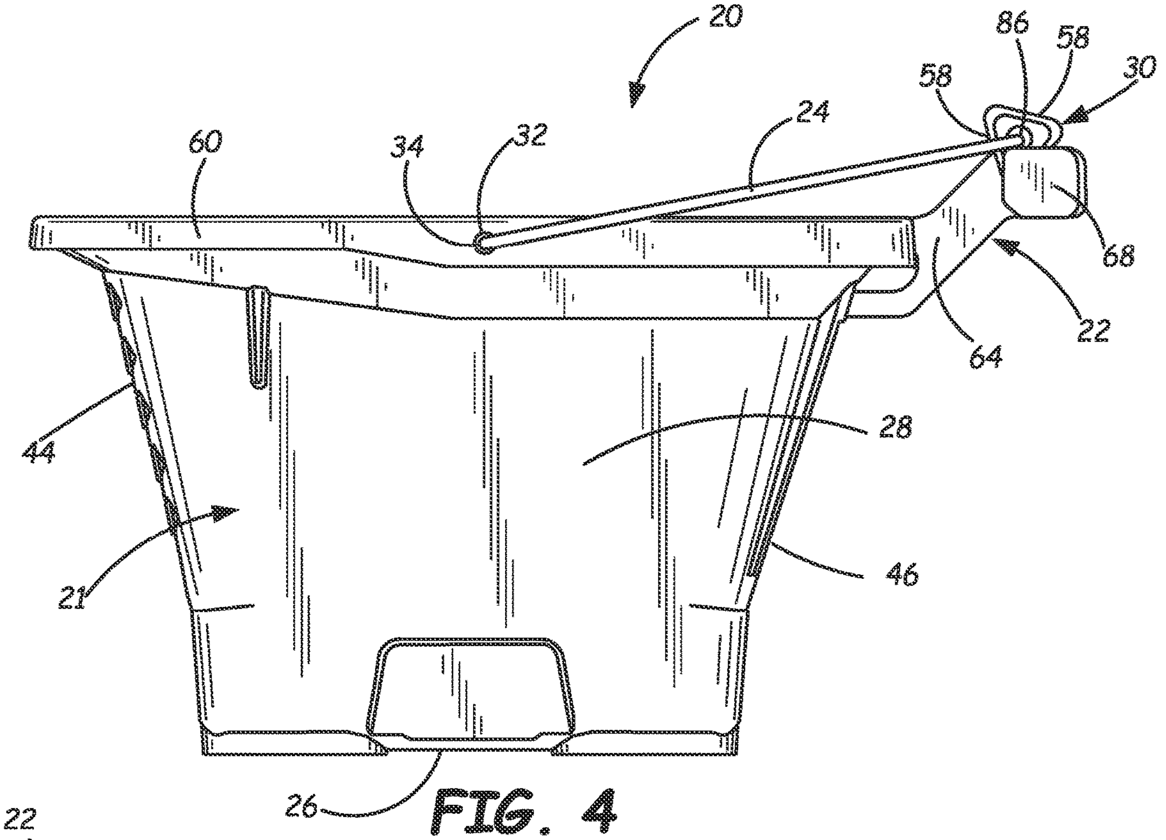
FIG. 4 is a side view thereof (as taken from the right side in FIG. 1).
Figure 5:
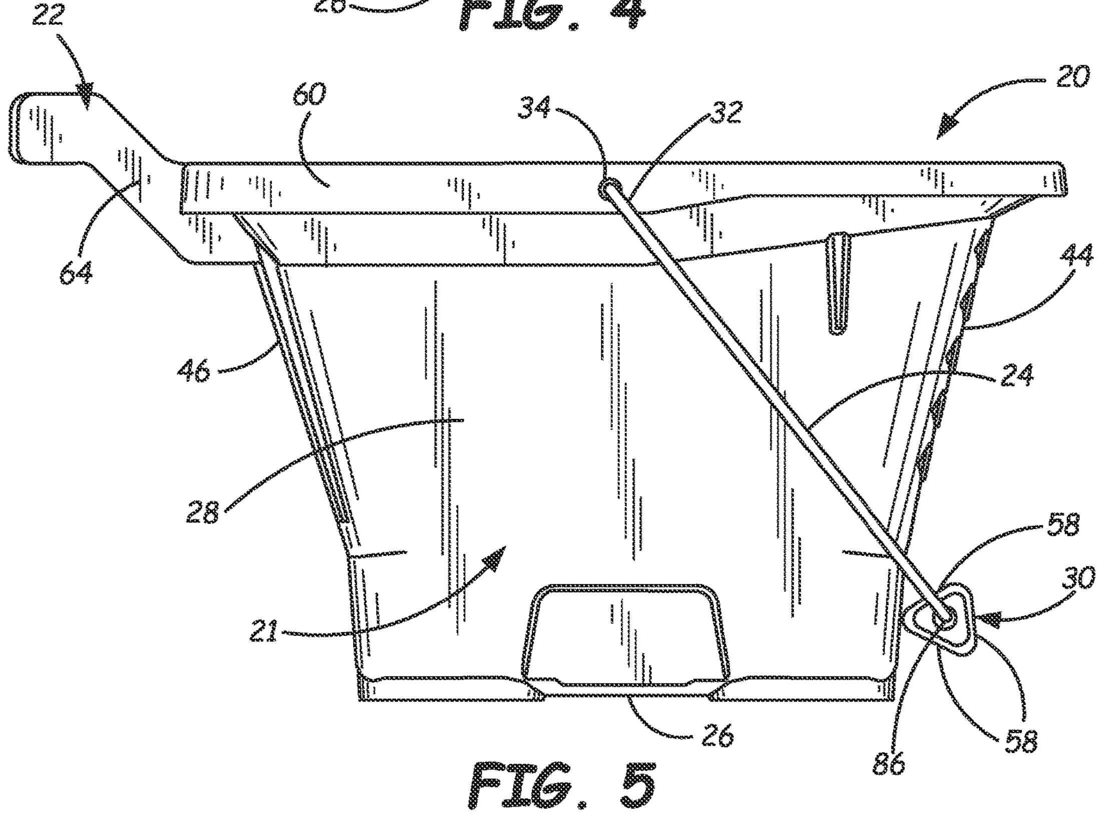
FIG. 5 is a side view thereof (as taken from the left side in FIG. 1), with a bail thereon pivoted to the front of the vessel.
Figure 6:
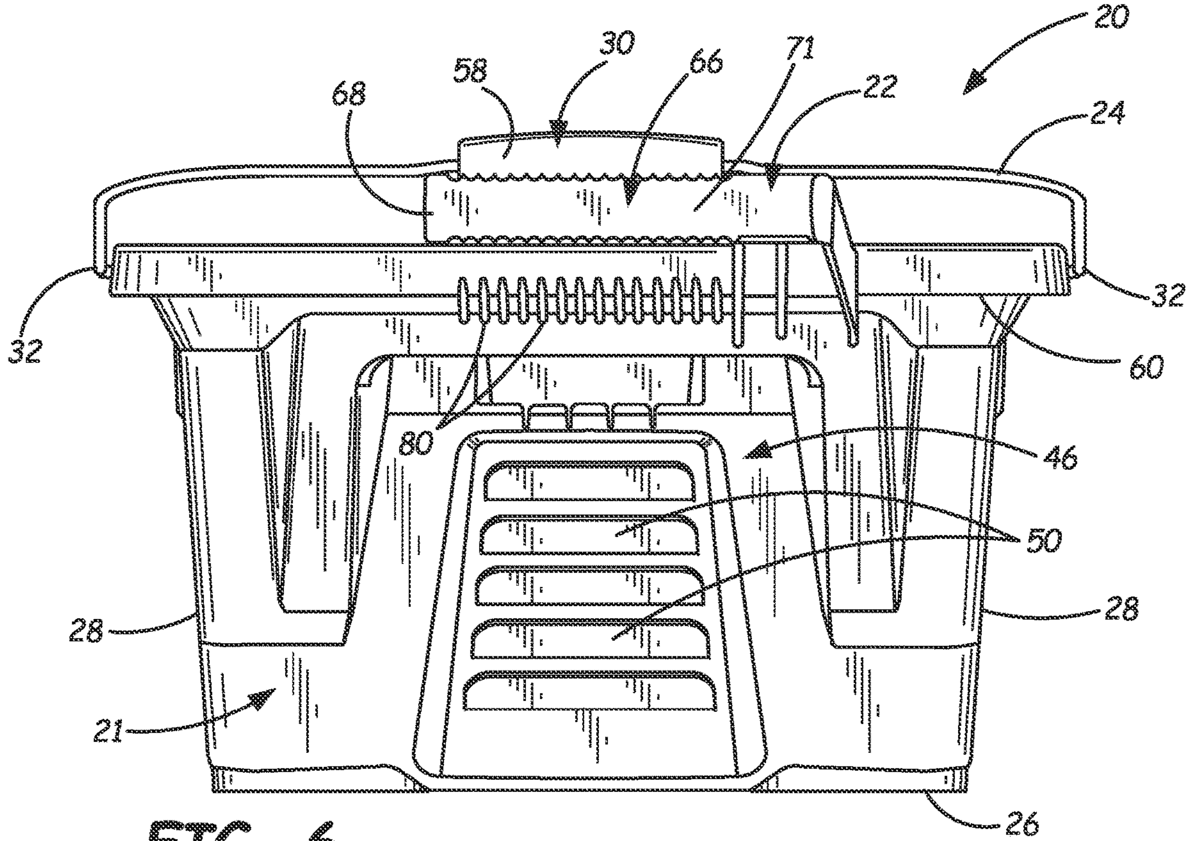
FIG. 6 is a rear view of the vessel of FIG. 1.
Figure 7:
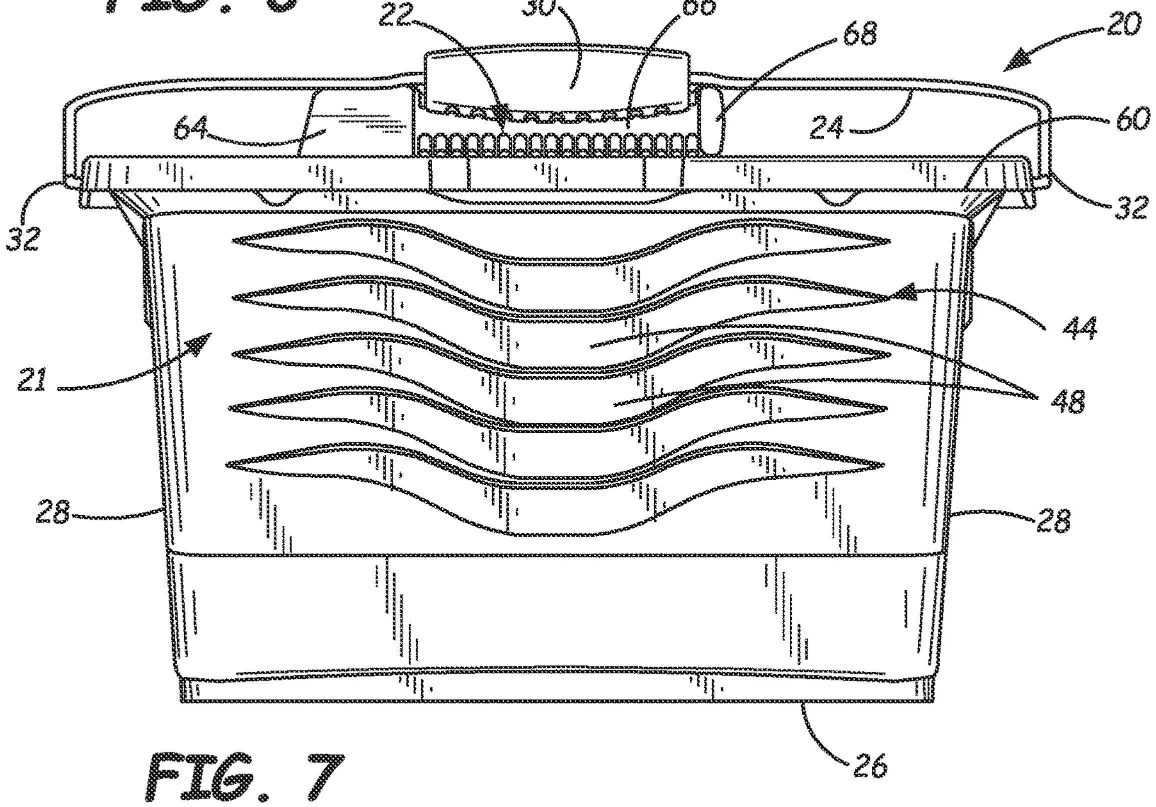
FIG. 7 is a front view thereof.

As shown in FIGS. 1 and 2, in an exemplary embodiment, bottom wall 26 is substantially flat and rectangular, offering a large, stable surface on which vessel 20 may rest on a horizontal surface such as a floor or table, for example. Another manner in which vessel 20 can be supported is by bail 24, which is pivotally connected to rim 60 at apertures 34. As with a pail, bail 24 can swing from a rear of vessel 20 to a front side thereof. Most of the drawing figures show bail 24 pivoted so its grip 30 rests on ladder bracket 22. However, as shown in FIGS. 5 and 13, bail 24 is be pivoted to a forward position, wherein the bail 24 clears the front of rim 60 so that grip 30 rests against front wall 44.

Figure 11:
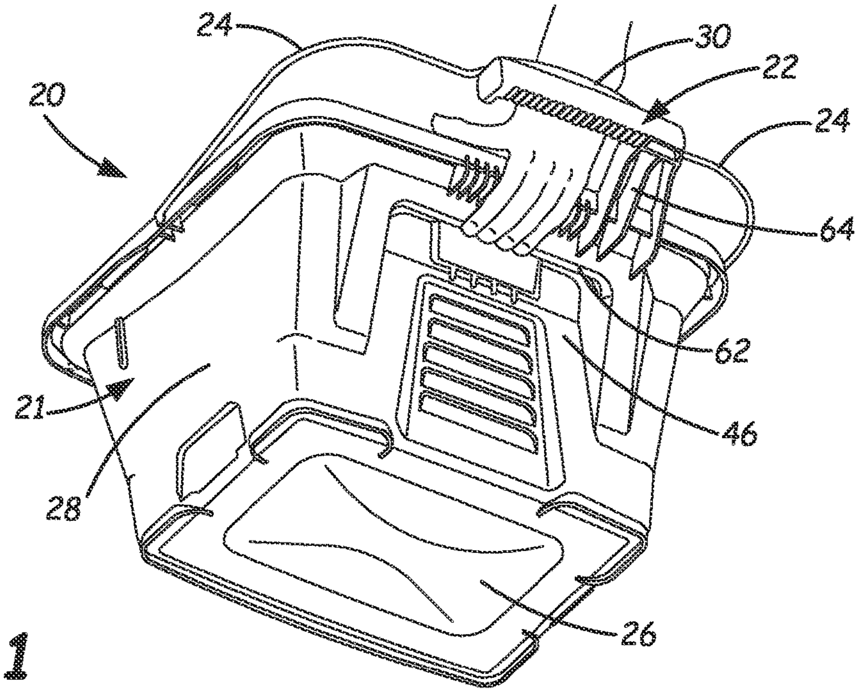
FIG. 11 is similar to FIG. 2 and shows a person holding the vessel by inserting fingertips into an underhook of the vessel and grasping the rear wall with a palm and thumb, with the front of the hand resting against at least the bail of the composite handle.

In an exemplary embodiment, grip 30 has a substantially triangular cross-sectional shape having three substantially flat surfaces 58. In an exemplary embodiment, bail 24 passes through bore 86 of grip 30, which freely spins about the inserted bail portion. Thus, when bail 24 is pivoted to a rear of vessel 20 so that grip 30 overlies ladder bracket 22, one of the flat surfaces 58 rests stably against the ladder bracket 22. Moreover, the spinning grip 30 of bail 24 allows container 21 to hang freely from bail 24, no matter what grasping orientation a user places on grip 30. In a configuration as shown in FIGS. 1-4 and 6-11, the ladder bracket 22 and bail grip 30 together form a composite handle by which a user can firmly support vessel 20, as shown in FIG. 10, with a hand position that surrounds both the grip 30 and portions of the ladder bracket 22. Another user engagement position on the composite handle is shown in FIG. 11, wherein the user's palm and thumb grip rear wall 46 as the front of the hand contacts at least the grip 30 of the composite handle, while his or her fingertips curl into underhang 62. At underhang 62, rear wall 46 extends inward into an interior of container 21 to form a depression on the exterior or rear wall 46 into which a user may insert one or more fingertips.

Figure 12:
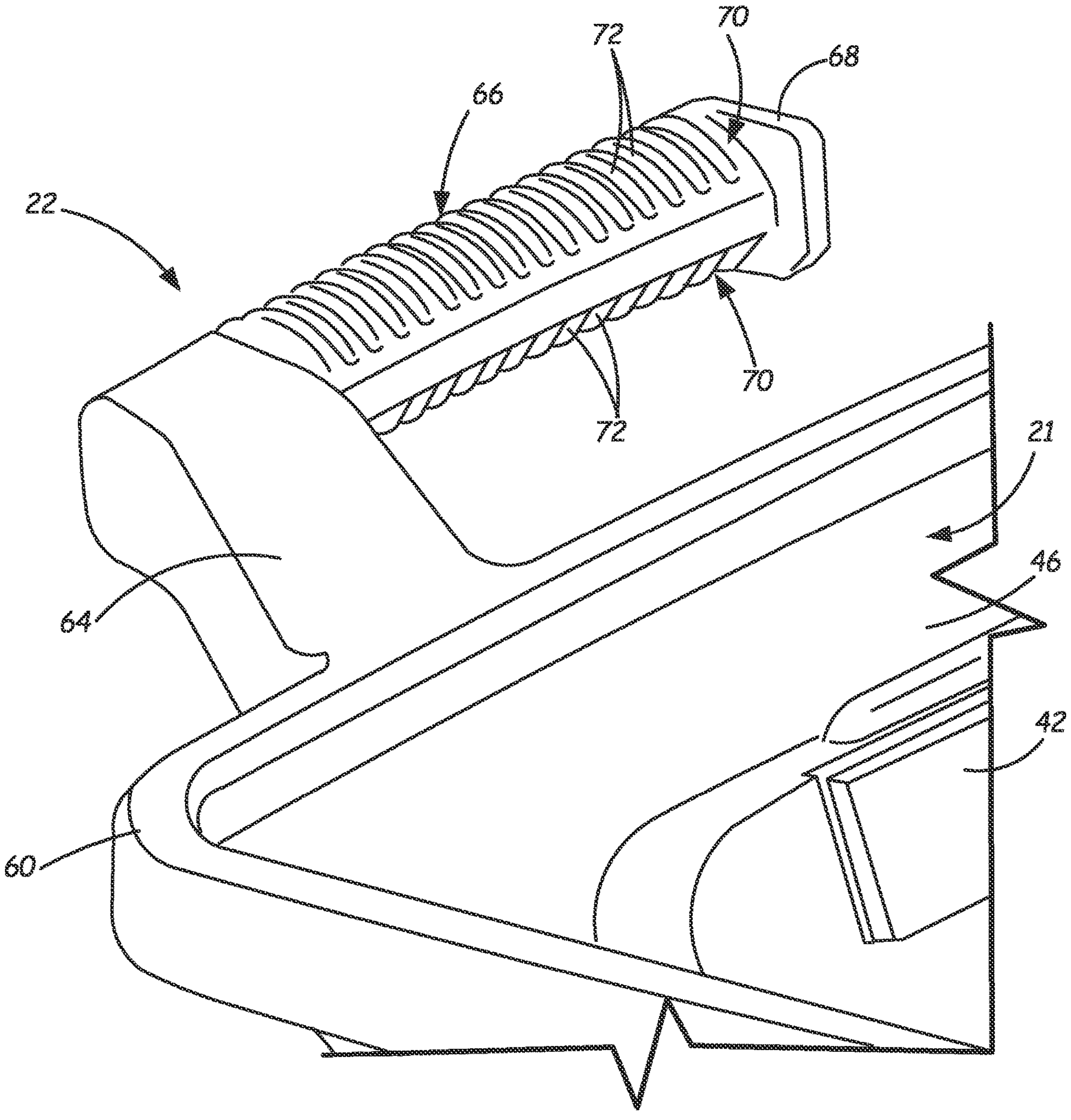
FIG. 12 is an enlarged perspective view of a ladder bracket of the vessel.

FIG. 12 is an enlarged perspective view of ladder bracket 22. In an exemplary embodiment, ladder bracket 22 is configured to extend from rear wall 46 and rim 60 and is connected to container 21 by an upwardly inclined brace 64. Arm 66 extends from brace 64 and has a longitudinal extent that is aligned substantially parallel to an orientation of rim 60 at rear wall 46. Arm 66 terminates at end protrusion 68, which is opposite brace 64. In an exemplary embodiment, arm 66 has a generally triangular cross-sectional shape, with two inclined front surfaces 70 and a back surface 71. Each of the two inclined front surfaces 70 is covered with a plurality of ridges 72.

Figure 13:
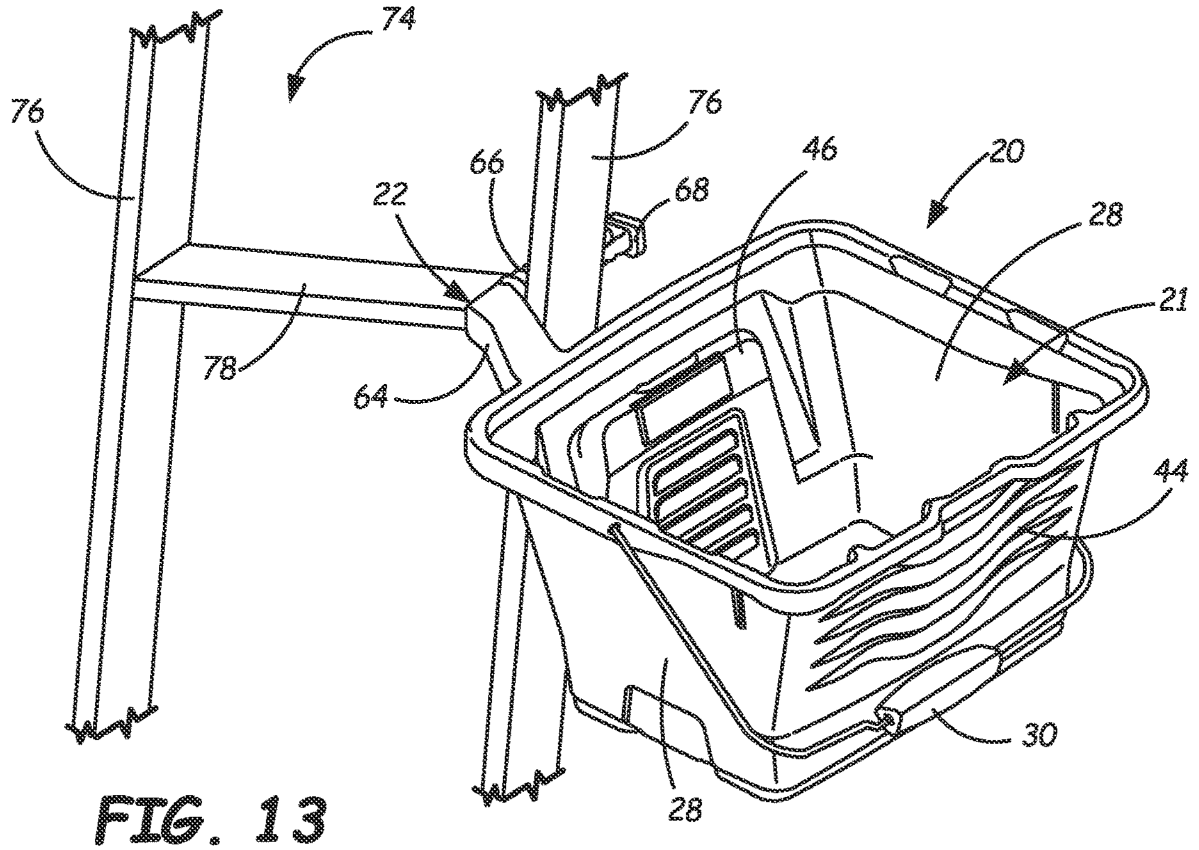
FIG. 13 is a perspective view of the vessel supported on a ladder rung and side rail by its ladder bracket.

FIG. 13 is a perspective view showing vessel 20 supported by ladder bracket 22 on a ladder 74 having side rails 76 and one or more rungs 78. In FIG. 13, bail 24 is swung forward as in FIG. 5. A bottom surface of arm 66 rests on a top surface of rung 78 so that arm 66 is on one side of rail 76 and container 21 is on an opposite side of the same rail 76. The ridges 72 act as surface texturing elements to grip and prevent sliding along. rung 78. Arm 66 is sized to extend completely around a side rail 76. Thus, when vessel 20 is moved so that brace 64 contacts the front surface of rail 76, protrusion 68 extends beyond a back surface of rail 76. Vessel 20 could be attached to the left rail 76, in which case the brace 64 would be proximate the back surface of a rail 76 as illustrated. End protrusion 68 acts as a hook to prevent unintentional disengagement of the ladder bracket 22 from side rail 76. The inclination of brace 64 allows container 21 to hang from ladder bracket 22 in a relatively level manner while accommodating various thicknesses of side rail 76. Arm 66 and grip 30 are also sized to complement each other, so that one of surfaces 58 of grip 30 rests stably along the ridges 72 of the top front inclined surface 70, between brace 64 and end protrusion 68. As shown in FIG. 2, reinforcing flanges 80 are provided on rear wall 46 connecting to rim 60 to reinforce and provide additional strength on a portion of the vessel 20 that rests against side rail 76.

Figure 8A:
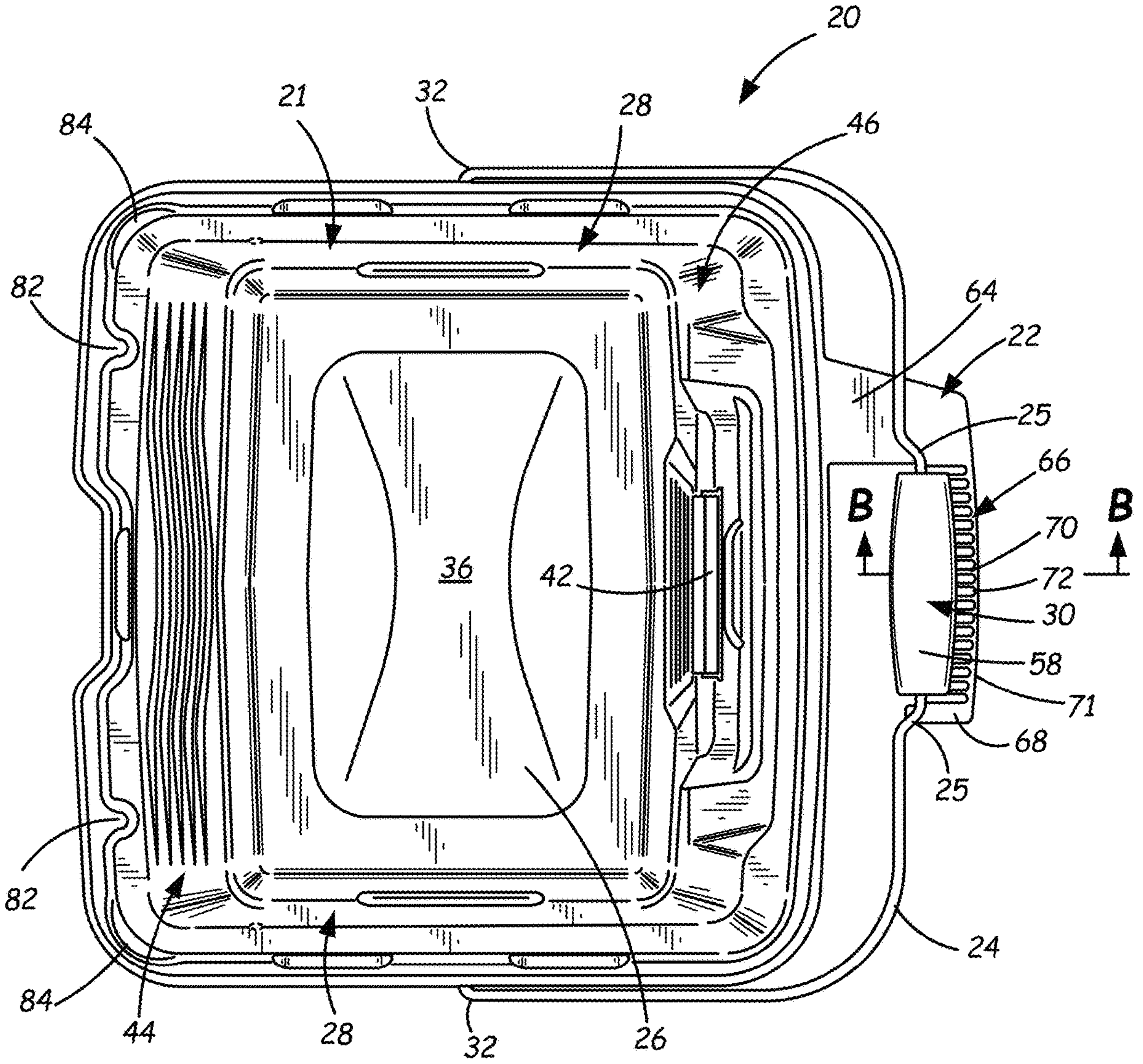
FIG. 8A is a top view thereof.
Figure 8B:
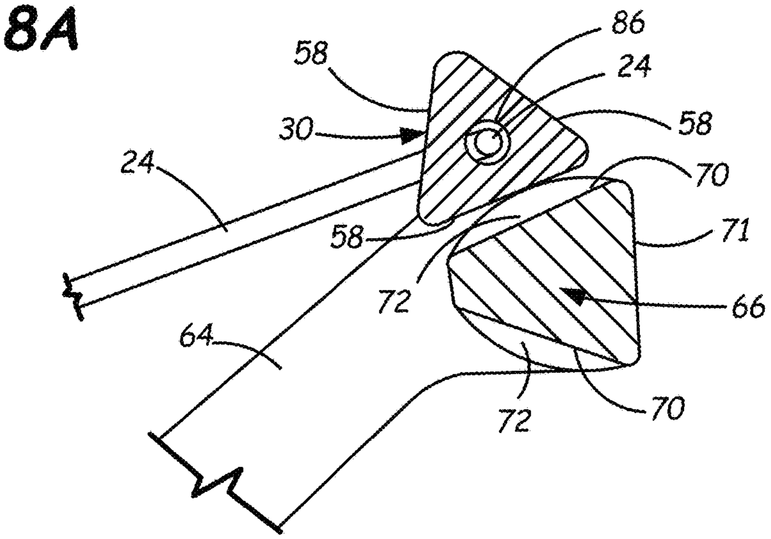
FIG. 8B is a cross-sectional view of FIG. 8A taken along line B—B.
Figure 9:
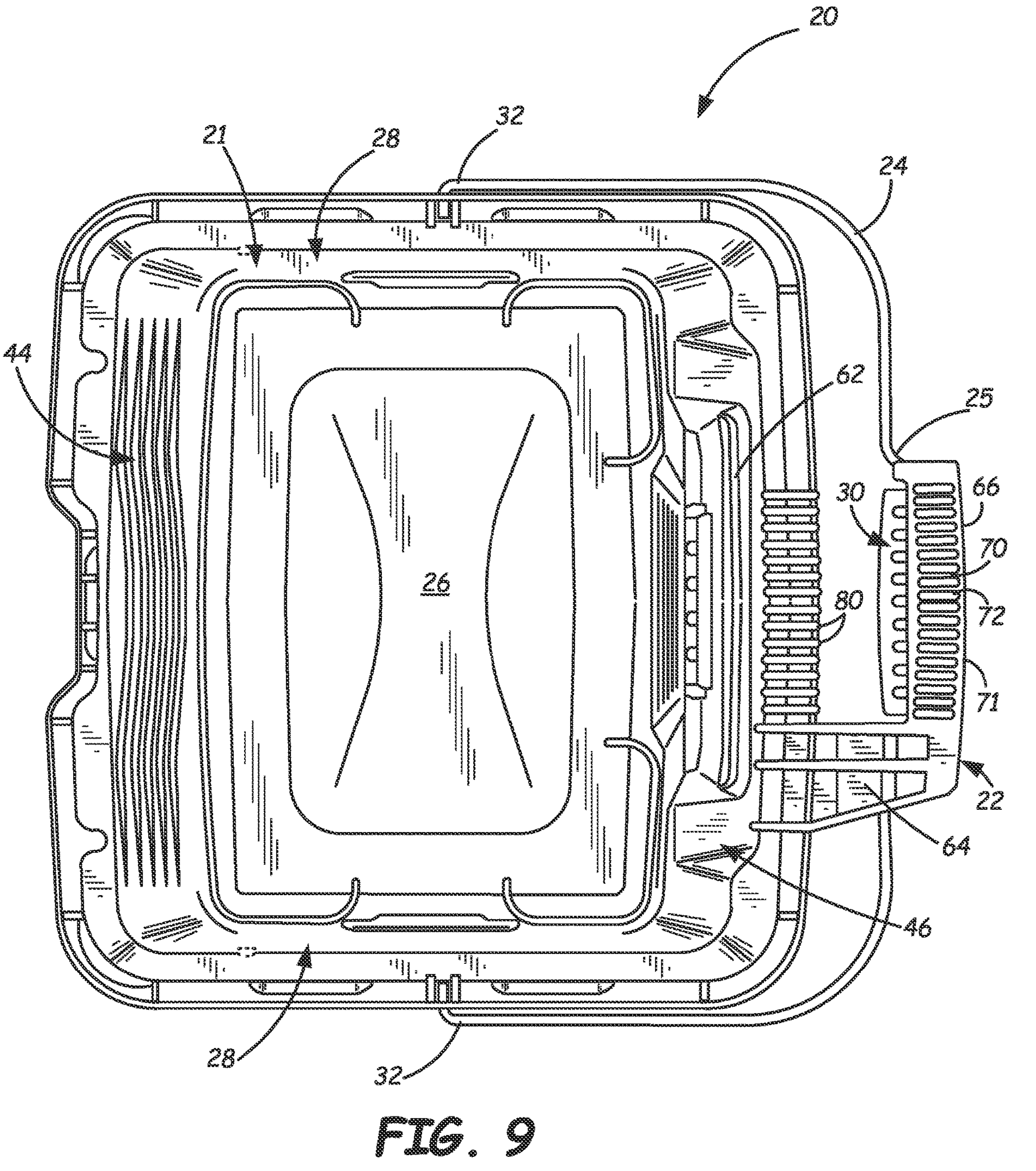
FIG. 9 is a bottom view of the vessel of FIG. 1.

In an exemplary embodiment, the front of rim 60 includes protrusions 82 configured to serve as retaining stops for tools held in container 21. For example, as shown in FIG. 10, paint roller 40 is inserted into container 21. To hold the paint roller 40 in place while the user moves vessel 20 by its composite handle, frame 54 of the paint roller 40 is laid against protrusion 82 to maintain a desired orientation of paint roller 40 within the large cavity of vessel 20. Thus held, frame 54 is likely to remain in position between protrusion 82 and the closest side wall 28, even as vessel 20 is maneuvered. As shown in FIG. 8A, in an exemplary embodiment, pouring spouts 84 are integrally formed into rim 60 at a corner between front wall 44 and a respective side wall 28.

The described vessel 20 can be supported in numerous ways. For example, it can be placed with its bottom wall 26 on a horizontal surface such as a floor or counter, for example. Vessel 20 can be carried as a pail, by a user's fingers curled about grip 30, so that the vessel is suspended by its bail 24. As shown in FIG. 13, it can be hung by ladder bracket 22 from a side rail 76 of a ladder 74, supported on rung 78. And as shown in FIGS. 10 and 11, it can be supported by a user at a composite handle formed of an overlaid grip 30 of bail 24 on arm 66 of ladder bracket 22. While certain methods of use are hereby described, it is contemplated that users may find other ways to carry or move vessel 20, such as suspending it from structures other than a ladder, for example.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. A vessel comprising:

a container having a cavity;

a bracket extending from the container, the bracket comprising an arm spaced from the container, the arm having opposed first and second ends, wherein the arm is connected to the container only at its first end;

a bail pivotally connected to the container; and a grip attached to at least a portion of the bail in a freely spinning manner, the grip comprising a substantially flat surface;

wherein the vessel is configured so that the grip has a grip position wherein the substantially flat surface is in contact with an inclined surface of the arm, thereby defining, in combination, a composite vessel handle in which the grip is inhibited from spinning against the arm.

2. The vessel of claim 1 comprising a brace connecting the first end of the arm and the container, wherein the brace extends upwardly from the container.

3. The vessel of claim 1 comprising a brace connecting the first end of the arm and the container, wherein the brace extends outwardly from the container.

4. The vessel of claim 3 wherein the second end of the arm comprises a protrusion.

5. The vessel of claim 4 wherein:

the arm has a first length between the brace and the protrusion; and the grip has a second length that is substantially equal to or less than the first length.

6. The vessel of claim 1 wherein the grip is disposed on a central portion of the bail.

7. The vessel of claim 1 wherein the grip has a substantially triangular cross-sectional shape.

8. The vessel of claim 1 comprising a brace connecting the first end of the arm and the container, wherein a portion of the container proximate the brace comprises a plurality of structural reinforcement flanges.

9. The vessel of claim 8, wherein the plurality of structural reinforcement flanges extend along the container at least a length of the arm.

10. The vessel of claim 1, wherein the container comprises a bottom wall connected to a front wall, a back wall, and two side walls, each of the front wall, back wall and two side walls extending upwardly and outwardly from the bottom wall so that a cross-sectional dimension of a top portion of the container is greater than a cross-sectional dimension of a bottom portion of the container.

11. The vessel of claim 10, wherein at least one of the front wall, back wall, and side walls comprises a plurality of ridges in an interior surface.

12. The vessel of claim 10 wherein the bracket extends from the back wall of the container, and wherein the back wall comprises a magnet.

13. The vessel of claim 1, wherein:

the container comprises a top rim; and the bracket extends from a back wall of the container, and wherein the back wall comprises an underhang that is spaced from the top rim and that is configured as an inward depression on an exterior side of the back wall.

14. The vessel of claim 1 comprising a liner disposed in the container.

* * * * *